United States Patent [19]

Park et al.

[11] 4,015,065
[45] Mar. 29, 1977

[54] TREATMENT OF VINYL HALIDE POLYMERS

[75] Inventors: Anthony John Park, South Croydon; Alan Charles Sturt, Guildford, both of England

[73] Assignee: The British Petroleum Company Limited, London, England

[22] Filed: May 5, 1975

[21] Appl. No.: 574,396

[30] Foreign Application Priority Data

May 17, 1974 United Kingdom ............. 22254/74

[52] U.S. Cl. ............................................. 528/503
[51] Int. Cl.² ...................... C08F 6/00; C08F 6/16; C08F 6/24; C08F 6/28
[58] Field of Search ............. 450/776; 260/92.8 A, 260/92.8 W, 87.5 R; 204/159.22, 159.17; 528/503

[56] References Cited

FOREIGN PATENTS OR APPLICATIONS

| 86,500 | 12/1971 | Germany | 450/766 |
| 628,092 | 8/1949 | United Kingdom | 450/766 |

*Primary Examiner*—Stanford M. Levin
*Attorney, Agent, or Firm*—Brooks Haidt Haffner & Delahunty

[57] ABSTRACT

Vinyl halide monomer content of vinyl halide polymer is reduced by subjecting the polymer to radio frequency dielectric heating in the presence of added polymerization initiator.

17 Claims, No Drawings

TREATMENT OF VINYL HALIDE POLYMERS

The present invention relates to a process for the treatment of polymers, and more specifically to a process for the removal or partial removal of vinyl halide monomer from vinyl halide polymers.

Vinyl halide polymers in general contain absorbed monomer. The monomer is removed during recovery of the polymer but it is difficult to produce monomer-free polymer. Moreover, unless special precautions are taken the monomer removed during recovery can present environmental hazards. Recent discoveries have linked vinyl chloride monomer with the rare cancer angio sarcoma of the liver and with other medical problems. It is thus highly desirable to reduce the level of residual vinyl halide monomer in vinyl halide polymers to the lowest possible value.

U.S. Pat. No. 3,434,220 discloses a process for drying polymers containing water or a polar diluent by subjecting the polymer to microwave radiation. In this specification residual material, such as water, in the polymer is removed by evaporation.

According to the present invention the process for treating a vinyl halide polymer containing residual vinyl halide monomer comprises subjecting the polymer to radio frequency dielectric heating in the presence of added free radical polymerisation initiator.

The vinyl halide polymer may be a vinyl halide polymer produced by the polymerisation of monomeric material consisting of vinyl halide and 0 to 30%, by weight of total monomeric material, of comonomers copolymerisable with vinyl halide. Examples of copolymerisable monomers are ethylene, propylene, vinyl acetate, vinyl laurate, vinyl stearate and vinylidene chloride.

The process of the present invention is particularly applicable to vinyl chloride polymer produced from a monomeric material consisting of vinyl chloride and from 0 to 20%, by weight of total monomeric material, of a comonomer copolymerisable with vinyl chloride. Thus, for example, the process is applicable to vinyl chloride homopolymers containing residual vinyl chloride.

The vinyl halide polymer to be subjected to radio frequency dielectric heating is normally a vinyl halide polymer with residual monomer absorbed during polymerisation. Typically the quantity of monomer will not exceed 3% (30,000 ppm.) by weight of polymer, although larger amounts may be present.

The polymer may be subjected to radio frequency dielectric heating directly after polymerisation or at a subsequent stage in its processing. Polymerisation takes place commonly in bulk, in aqueous suspension or microsuspension or in aqueous emulsion. The process of the present invention is particularly suited for the treatment of vinyl chloride polymer, containing residual monomer, in the form of beads recovered from suspension polymerisation.

The process may, for example, be applied to polymers made by emulsion/suspension process, for example, as described in United Kingdom patent specification Nos. 1,309,582, 1,341,386 and 1,351,461.

The present invention is capable of treating monomer/polymer mixtures produced by any of these processes. As the present method is capable of removing water as well as residual monomer it is not necessary to dry aqueous dispersion polymers before treatment. Polymers recovered from an aqueous dispersion before drying will often have up to 20% water present, based on weight of dry polymer. Any amount of water may be handled by the process of the present invention however. For example microsuspensions which are commonly spray dried may instead be treated directly by the process of the present invention to remove both water and residual monomer.

Exposure to dielectric heating may be carried out in batch or continuous fashion. To avoid overheating it is preferable to carry out the exposure continuously either by passing the polymer through the treatment area in a layer (e.g. of polymer beads supported on a belt) or to blow polymer particles through the treatment area.

The exposure time may be for periods of 0.1 seconds or less up to 100 minutes, but preferably lies in the range 1 second to 40 minutes, more particularly 1 to 30, for example 1 second to 10 minutes. Times in excess of 1 minute, preferably in excess of 2 minutes are often desirable. The exposure time is preferably chosen in relation to the power applied to the polymer to ensure that the polymer being treated reaches a temperature in the range 70° to 120° C. At higher temperatures the polymer tends to be degraded.

The radio frequency dielectric heating employed in the process of the present invention is well-known to those skilled in the art of electric heating. Dielectric heating is a method of heating poor electrical conductors by subjecting them to an alternating voltage. The electrical power transferred to the material as heat is a function of frequency, the potential across the material and the dielectric properties of the material. In low frequency dielectric heating the material to be heated is placed between electrodes across which an alternating voltage is applied. The voltage applied is controlled so as not to exceed the breakdown voltage of the material to be heated. The frequencies used for low frequency dielectric heating are typically in the range 1 to 150 MHz, for example 20 to 100 MHz. Although higher frequencies can be used in dielectric heating between electrodes the electrodes need to be smaller to avoid high capacitance between the electrodes leading to excessive damping of the alternating voltage, and radiation of stray electromagnetic radiation is increased.

Microwave heating is a special case of radio frequency dielectric heating. In microwave heating the required alternating voltage is provided by the electrical component of microwave electromagnetic radiation to which the material to be treated is subjected within an enclosure of conducting material. The material to be treated may be placed inside a resonant cavity in which a standing microwave field is produced or in a wave guide along which microwave electromagnetic radiation is passed. The design and operation of microwave ovens is well understood by those skilled in the microwave heating art.

Any microwave frequency can be employed, e.g. in the range 600 to 50,000 MHz and suitably in the range 900 to 30,000 MHz. It should be noted that there are legal limitations on the use of microwaves of certain wavelengths in many countries throughout the world.

Suitably the process of the present invention is operated with exposure times and applied power so that there are less than 50 ppm monomer in the treated polymer, preferably less than 25 ppm and most preferably to less than 0.5 ppm.

It is believed that dielectric heating acts selectively on polar molecules and thus for example acts more strongly on monomers such as vinyl chloride and water than on polyvinyl chloride. Thus as a heating process it has the advantage of selectively heating absorbed monomer inside polymer particles without the need for the heat to transfer to the particle as in a normal heating process.

When polymer is prepared from the monomer it is necessary to introduce an initiator to enable the polymerisation to commence. This initial quantity of initiator required to start polymerisation is not the added initiator required by the process of the present invention. The added initiator is initiator added to polymer and thus is added at a stage at which at least some polymerisation has already taken place. If the initiator is added during polymerisation, the initiator and or the time between starting the polymerisation and addition of the initiator is preferably such that a substantial amount of the initiator (e.g. greater than 50% by weight of the amount added remains at the end of polymerisation. Any initiator added during polymerisation is preferably added after at least 50% conversion of monomer to polymer has taken place, more preferably after 60 to 75% by weight of the monomer has been converted to polymer. Thus it may be convenient to add the added initiator at the "pressure drop". The pressure drop is the drop in pressure within the reactor which takes place when the reaction is nearing completion, i.e. active polymerisation has ceased and in the case of vinyl chloride polymerisation usually takes place when about 70% by weight of the vinyl chloride has been converted to polymer. The initiator added during polymerisation is preferably of the same type as that used to start polymerization. Thus for suspension and microsuspension polymerization it is preferred that any added initiator is monomer soluble while for emulsion polymerisation it is preferred that any added initiator is water-soluble.

Alternatively the added initiator may be brought into contact with the polymer after polymerisation has ended, e.g. by adding the initiator to the polymerisation reactor. The polymer may instead be recovered from the polymerisation reactor before the added initiator is brought into contact with the polymer.

The added initiator, when added after polymerisation has ended need not be of the same type as that used in the polymerisation. Thus a water-soluble initiator may be added in aqueous solution not only to polymer prepared by emulsion polymerisation, but to polymer prepared by bulk, suspension or microsuspension polymerisation using monomer-soluble catalysts. Similarly monomer-soluble initiator dissolved in an organic solvent may be added to polymer prepared by emulsion polymerisation using water-soluble catalysts as well as to polymer prepared using monomer-soluble catalysts, e.g. by suspension, microsuspension or bulk polymerisation.

Where the initiator is added after polymerisation has ended the quantity added may for example be 0.01% to 1%, preferably 0.02% to 0.2%, based on weight of any polymer. Preferably the minimum quantity of initiator present at the beginning of the radio frequency dielectric treatment is 0.1% for suspension polymer and 0.2% for emulsion polymer based on weight of dry polymer.

It may even be advantageous to add additional monomer-soluble initiator dissolved in vinyl halide to the recovered polymer. The amount of vinyl halide employed to introduce the additional initiator should be kept as small as possible.

The added initiator may be a conventional vinyl halide polymerisation initiator. Examples of suitable initiators are ammonium persulphate, caprylyl peroxide, lauroyl peroxide, benzoyl peroxide, dicyclohexyl peroxy dicarbonate and azo bis isobutyronitrile.

A preferred initiator for use in the process of the present invention is also azo bis diisobutyronitrile which can be used as an aqueous solution but does not have a deleterious effect on electrical properties of the final polymer in the same way as persulphate initiators.

The invention will now be illustrated by reference to the following Examples.

EXAMPLE 1

A conventional polyvinyl chloride suspension homopolymer was prepared using lauroyl peroxide as the initiator and methyl cellulose as the suspending agent.

A 200g sample of the polymer was slurried with 200ml of a 0.2% solution of ammonium persulphate for 10 minutes. The polymer was centrifuged. The moisture content of the centrifuged resin was 18.3% wt/wt and the monomer content was 1.2% wt/wt. A 100g sample of this centrifuged polymer was irradiated in a microwave oven at a frequency of 2450 MHz for 10 minutes. The final moisture content was 2.5% wt/wt and the monomer content was 14 ppm.

TEST A

This is a Comparative Example in which no initiator was added. A 100g sample of the polymer used in Example 1 had a monomer content of about 1% and moisture content of 16% by weight. The resin was not treated with initiator. The resin was irradiated in a microwave oven at a frequency of 2450 MHz for 10 minutes as in Example 1. The final moisture content was 8% by weight and the monomer content was 80 ppm.

EXAMPLE 2

A batch low frequency dielectric heating oven operated at a frequency of 27 MHz and provided with an A.C. generator with a maximum power of 3 kW was used in this experiment. A sample of PVC homopolymer resin in the form of beads recovered from suspension polymerisation was washed with a 0.25% by weight solution of ammonium persulphate. The water from the solution was drained off to give a product with a total solids content of 90% by weight based on the total weight of sample, (i.e. 10% by weight of water).

The vinyl chloride content of the polymer before the radio frequency treatment was 7000 ppm.

A sample of 50g of the wet polymer was placed between the electrodes in the oven and subjected to radio frequency dielectric heating for 3 minutes at a power of about 10 kW. The final vinyl chloride monomer content of the polymer was 531 ppm. and the total solids content of the treated material was about 99% by weight.

EXAMPLE 3

An experiment was carried out as in Example 1 except that the radio frequency dielectric heating was continued for 1½ minutes. The final vinyl chloride monomer content was 1480 ppm.

TEST B

This is a Comparative Example not according to the invention.

An experiment was carried out as in Example 3 except that the polymer was washed with water only instead of ammonium persulphate solution. The heating was for 1½ minutes as in Example 3. The final vinyl chloride monomer content of the polymer was 3400 ppm.

EXAMPLE 4

A 200g sample of wet suspension PVC homopolymer slurry was treated with 200ml of a 0.2% wt/wt solution of azobisbutyronitrile in ethanol for 10 minutes, and was then centrifuged.

The polymer had a moisture content of 16.1% wt/wt and a monomer content of 3,040 ppm.

A 100g sample of the polymer was irradiated at 2,450 MHz for 10 minutes to give a final moisture content of 1.1% wt/wt and a final vinyl chloride monomer content of less than 3 ppm. (below the limit of detection).

We claim:

1. A process for treating vinyl halide polymer containing residual vinyl halide produced by the polymerization of monomeric material consisting of vinyl halide and 0 to 30% by weight of total monomeric material of comonomers copolymerizable with vinyl halide which comprises subjecting said polymer to radio frequency dielectric heating in the presence of added free radical polymerization initiator.

2. A process according to claim 1 wherein the vinyl halide polymer is polyvinyl chloride, the vinyl halide it contains is vinyl chloride, and the polymer is produced from a monomeric material consisting of vinyl chloride and from 0 to 20% by weight of total monomeric material of comonomer copolymerisable with vinyl chloride.

3. A process according to claim 1 wherein the amount of residual vinyl halide monomer does not exceed 3% by weight of the polymer.

4. A process according to claim 1 wherein the polymer contains up to 20% by water based on weight of dry polymer.

5. A process according to claim 1 wherein the polymer is subjected to radio frequency dielectric heating for a time in the range 0.1 second to 100 minutes.

6. A process according to claim 5 wherein the polymer is subjected to radio frequency dielectric heating for a time in the range 1 second to 40 minutes.

7. A process according to claim 6 wherein the polymer is subjected to radio frequency dielectric heating for a time of at least one minute.

8. A process according to claim 6 wherein the polymer is subjected to radio frequency dielectric heating for a time sufficient to raise the temperature of the polymer to a temperature in the range 70° to 120° C.

9. A process according to claim 1 wherein the polymer is subjected to low frequency dielectric heating between electrodes.

10. A process according to claim 9 wherein the frequency used is in the range 1 to 150 MHz.

11. A process according to claim 1 wherein the polymer is subjected to microwave radiation.

12. A process according to claim 11 wherein the microwave radiation is at a frequency of 600 to 50,000 MHz.

13. A process according to claim 12 wherein the frequency is in the range 900 to 30,000 MHz.

14. A process according to claim 1 wherein initiator is brought into contact with the polymer after polymerisation is ended.

15. A process according to claim 14 wherein from 0.01% to 1% by weight of initiator, based on weight of dry polymer is added to the polymer after polymerisation has ended.

16. The process according to claim 1 wherein the minimum quantity of initiator present at the beginning of the radio frequency dielectric heating of suspension polymer is 0.1% by weight of dry polymer.

17. A process according to claim 2 wherein the polymer subjected to radio frequency dielectric heating is vinyl chloride polymer in the form of beads recovered from suspension polymerization and containing residual monomer.

* * * * *